(12) United States Patent
Suzuki

(10) Patent No.: US 6,266,911 B1
(45) Date of Patent: Jul. 31, 2001

(54) AUTOFOCUSING APPARATUS OF A SIGHTING TELESCOPE

(75) Inventor: Shinichi Suzuki, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,630

(22) Filed: Oct. 14, 1999

(30) Foreign Application Priority Data

Oct. 14, 1998 (JP) .................................................. 10-291937

(51) Int. Cl.[7] ....................................................... F41G 1/38
(52) U.S. Cl. .......................... 42/119; 89/203; 250/201.2; 359/426
(58) Field of Search ................. 42/101; 33/245; 359/426; 356/247; 250/201.2

(56) References Cited

U.S. PATENT DOCUMENTS

| | | | |
|---|---|---|---|
| 3,782,822 | * | 1/1974 | Spence ..................................... 356/21 |
| 5,180,875 | * | 1/1993 | Berry, Jr. et al. ...................... 42/101 |
| 5,276,554 | * | 1/1994 | Nassivera ............................... 359/694 |
| 5,388,005 | * | 2/1995 | Wilson ................................... 359/694 |
| 5,528,847 | * | 6/1996 | Fisher et al. ........................... 42/101 |
| 5,796,517 | | 8/1998 | Sensui et al. .......................... 359/426 |
| 5,844,231 | | 12/1998 | Suzuki et al. .......................... 250/201.2 |
| 5,872,661 | | 2/1999 | Suzuki et al. .......................... 359/698 |
| 5,877,892 | | 3/1999 | Nakamura et al. ..................... 359/426 |
| 5,903,996 | * | 5/1999 | Morley ..................................... 42/103 |

* cited by examiner

Primary Examiner—Charles T. Jordan
Assistant Examiner—Denise J Buckley
(74) Attorney, Agent, or Firm—Greenblum & Bernstein, P.L.C.

(57) ABSTRACT

An autofocusing apparatus of a telescope, includes: a telescopic optical system which includes a focusing lens group guided along an optical axis; a focus detector which detects a focus state of the telescopic optical system; a lens driver which drives the focusing lens group along the optical axis; an AF switch which is manually operated; and a controller which performs a first AF operation to control the lens driver to move the focusing lens group to an in-focus position on the optical axis in accordance with a result of detection of the focus detector each time the AF switch is operated; wherein the controller performs a second AF operation when the AF switch is operated more than once within a predetermined period of time, after the first AF operation is performed, the second AF operation including the movement of the focusing lens group by the lens driver to move the focusing lens group until the focusing lens group is moved to a second in-focus position other than the in-focus position, upon a later operation of the AF switch within the predetermined period of time; the second in-focus position being determined in accordance with the result of detection of the focus detector that is repeatedly actuated during the movement of the focusing lens group.

10 Claims, 6 Drawing Sheets

AUTOFOCUSING APPARATUS OF A SIGHTING TELESCOPE

BACKGROUND OF THE INVENTION

1. Field of the Invention

The present invention relates to an autofocusing apparatus suitable for a sighting telescope incorporated in a surveying instrument such as an automatic level, a transit, a theodolite, etc.

2. Description of the Related Art

A conventional surveying instrument such as an automatic level (auto-level), a transit, or a theodolite, etc., is generally provided with a sighting telescope, a level and a measuring device which measures a rotational angle, a descending angle, and a ascending angle, etc. When this type of surveying instrument is used, the sighting telescope is positioned horizontally, and subsequently the horizontal and vertical adjustments for the sighting telescope are performed. Thereafter, the sighting telescope is aimed at a reference object or a reference point so that the reference object is sighted by a surveyor.

For instance, the optical system of the sighting telescope of an automatic level includes an objective lens group, a focusing lens group and an eyepiece, arranged in that order from the object side. The position of the focusing lens group is adjusted depending on the object distance, so as to form a sharp object image on a reticle provided on the focal plane. The object image formed on the reticle can be viewed through the eyepiece.

In a conventional sighting telescope provided with an autofocusing system, immediately after the AF start button of the autofocusing system is depressed by the user, the focusing lens group of the system is driven from a current position (e.g., initial position) to another position to bring a sighting object into focus. According to a phase-difference detection AF system, a focal point which is firstly detected by the AF system is regarded as an actual focal point for the sighting object, so that the AF system drives the focusing lens group to an axial position thereof which corresponds to the initially detected focal point to stop the focusing lens group thereat.

A sighting telescope is different from a telephoto-photographic lens used for cameras or regular observational telescopes; namely, that the focus detection range of sighting telescope from an infinite distance to the close-up extremity is much greater (e.g., by a number of centimeters). When such an excess detection range is converted into the amount of movement of the focal point, the distance of movement exceeds from 100 mm through 200 mm. The focus detection range of an AF unit of a phase-difference detection type is approximately ±15 mm from an assuming focal point, so that the focus detection range of the AF unit can cover merely a fraction of the whole focus detection range of a sighting telescope. Accordingly, the phase-difference detection AF unit is used for a sighting telescope, wherein there is a high probability that an actual focal point (target focal point) of the sighting object be positioned out of the focus detection range. Therefore, specifically in the case of the conventional sighting telescope being provided with an AF system having a phase-difference detection AF unit, there is a probability that other objects (non-target objects) rather than the sighting object (target object) be brought into focus if the AF system moves the focusing lens to an axial position thereof which corresponds to the initial detected focal point.

SUMMARY OF THE INVENTION

The primary object of the present invention is to provide an autofocusing apparatus of a sighting telescope which makes it possible to bring a sighting object into focus in a quick manner via a simple operation.

Other objects of the present invention will become apparent to one skilled in the art from a reading of the following disclosure and the appended claims.

To achieve the object mentioned above, according to an aspect of the present invention, there is provided an autofocusing apparatus of a telescope, including: a telescopic optical system which includes a focusing lens group guided along an optical axis; a focus detector which detects a focus state of the telescopic optical system; a lens driver which drives the focusing lens group along the optical axis; an AF switch which is manually operated; and a controller which performs a first AF operation to control the lens driver to move the focusing lens group to an in-focus position on the optical axis in accordance with a result of detection of the focus detector each time the AF switch is operated. The controller performs a second AF operation when the AF switch is operated more than once within a predetermined period of time, after the first AF operation is performed, the second AF operation including the movement of the focusing lens group by the lens driver to move the focusing lens group until the focusing lens group is moved to a second in-focus position other than the in-focus position, upon a later operation of the AF switch within the predetermined period of time; the second in-focus position being determined in accordance with the result of detection of the focus detector that is repeatedly actuated during the movement of the focusing lens group.

Preferably, there is further provided a lens position memory which stores a position of the focusing lens group on the optical axis after the focusing lens group is moved each time the AF switch is operated; wherein the controller controls the lens driver to move the focusing lens group to a position other than the position stored in the lens position memory in the second AF operation.

Preferably, the controller erases all the positions stored in the lens position memory if the AF switch is not operated more than once within the predetermined period of time.

Preferably, the autofocusing apparatus is incorporated in a surveying instrument.

Preferably, the focus detector includes a photosensor of a phase-difference detection type which includes a pair of line sensors.

Preferably, the lens position memory includes a RAM in which positional data of the focusing lens group is stored.

According to another aspect of the present invention, there is provided an autofocusing apparatus of a telescope, including: a telescopic optical system which includes a focusing lens group guided along an optical axis; a focus detector which detects a focus state of the telescopic optical system; a lens driver which drives the focusing lens group along the optical axis; and a controller which controls the lens driver in either one of a first control and a second control. In the first control, the controller controls the lens driver to move the focusing lens group to an in-focus position on the optical axis in accordance with a result of detection of the focus detector; and wherein in the second control, after the first control has been performed, the controller performs an operation to control the lens driver to move the focusing lens group until the focusing lens group is moved to a second in-focus position other than the in-focus position, the second in-focus position being determined in accordance with the result of detection of the focus detector that is repeatedly actuated during the movement of the focusing lens group.

Preferably, there is further provided an AF switch which is manually operated, wherein the first control is executed every time the AF switch is operated.

Preferably, the second control is executed when a predetermined operation that is different from the operation of the AF switch in the first control is performed.

Preferably, the predetermined operation includes operating the AF switch more than once within a predetermined period of time; and wherein the operation to move the focusing lens group to the second in-focus position is executed by a later operation of the AF switch.

The present disclosure relates to subject matter contained in Japanese Patent Application No. 10-291937 (filed on Oct. 14, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
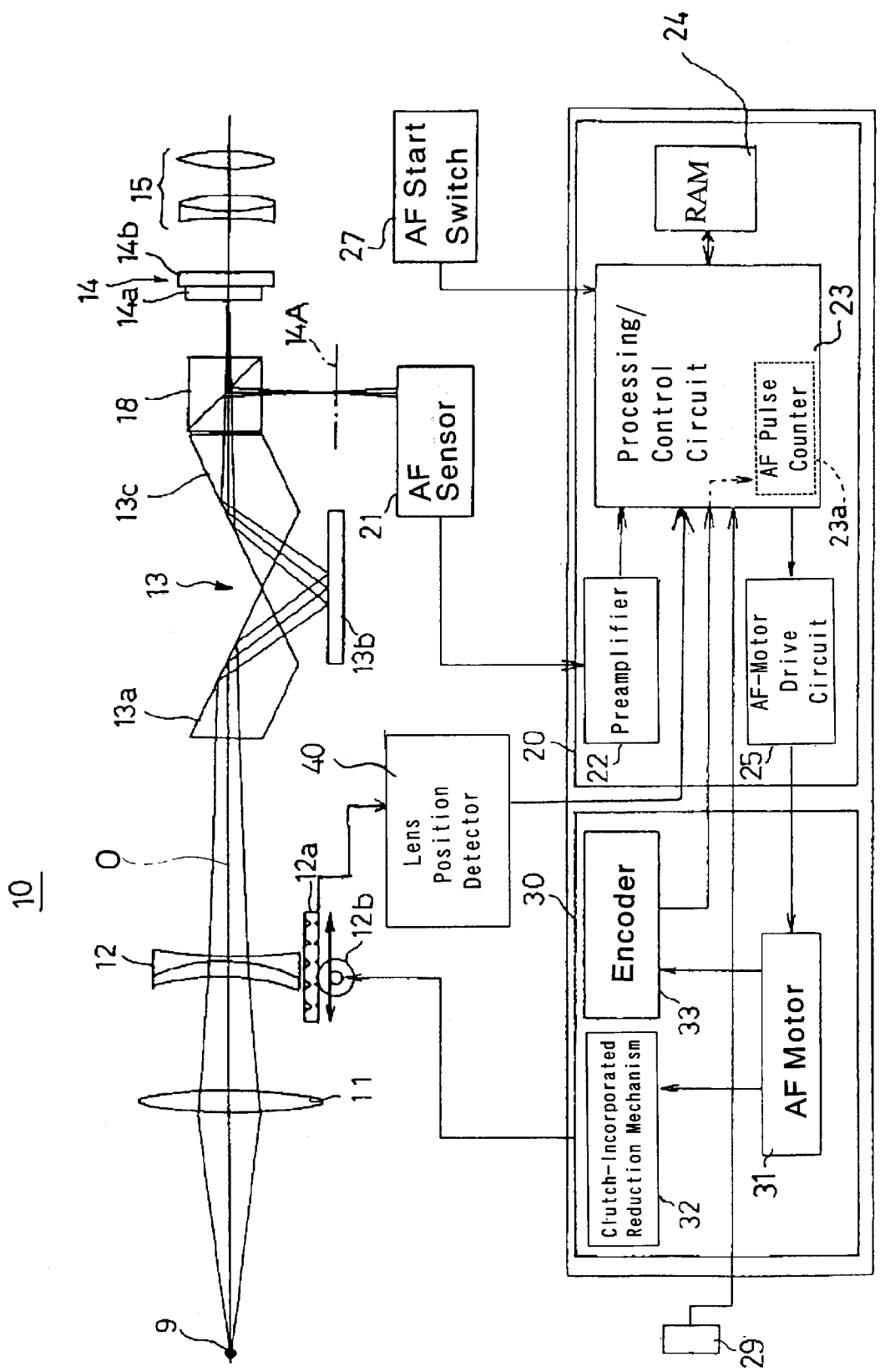
FIG. 1 is a schematic diagram showing fundamental elements of an embodiment of an automatic level to which the present invention is applied.

FIG. 1 shows an embodiment of an automatic level to which the present invention is applied. The automatic level (surveying apparatus) 10 is provided with a telescopic optical system (sighting telescope) which includes a positive objective lens group 11, a negative focusing lens group 12, a horizontal compensating optical system 13, a reticle plate (focal plane) 14, and a positive eyepiece lens 15, in that order from the object side (i.e., left to right in FIG. 1). The reticle plate 14 is composed of a first plate 14a and a second plate 14b.

The horizontal compensating optical system 13, per se known, is provided with a first compensating prism 13a, a compensating mirror 13b and a second compensating prism 13c, and has a symmetrical shape with respect to the center of the compensating mirror 13b. The horizontal compensating optical system 13 hangs from a cord/string (not shown) attached to a shaft (not shown).

The absolute angles between the compensating mirror 13b and the first and second compensating prisms 13a and 13c are the same; however, the signs (i.e., "+" or "−") of the actual angles thereof are the opposite. The value angle of the compensating mirror 13b relative to either compensating prism can be, for example, thirty degrees (30°). This angle varies depending on predetermined factors such as the length of the above-mentioned cord/string from which the horizontal compensating optical system 13 hangs. If the automatic level is set with an optical axis O of the objective lens group 11 and the focusing lens group 12 extending almost horizontally but being slightly inclined to a real horizontal plane by an angle ten to fifteen minutes, the light bundle that is passed through the objective lens group 11 and the focusing lens group 12 to be incident on the first compensating prism 13a is also inclined to the real horizontal plane by the same angle. However, the light bundle that emerges from the second compensating prism 13c after having been reflected by the first compensating prism 13a, the compensating mirror 13b and the second compensating prism 13c, has substantially no inclination relative to the real horizontal plane.

A rack 12a is fixed to the focusing lens group 12, while a pinion 12b is engaged with the rack 12a, so that rotating the pinion 12b causes the focusing lens group 12 to move along the optical axis O via the rack 12a. Therefore, the image of an object (sighting object) 9 that is formed through the objective lens group 11 and the focusing lens group 12 can be moved along the optical axis by rotating the pinion 12b. The user of the automatic level 10 sights the image of the object 9 which is focused on the reticle plate 14, together with, for example, a collimation axis formed on the reticle plate 14.

The automatic level 10 is provided between the second compensating prism 13c and the reticle plate 14 with a beam splitter (half-mirror) 18 that splits a bundle of light falling thereon into two light bundles. Part of the light emitted from the horizontal compensating optical system 13 is reflected by the beam splitter 18 at right angles towards an AF sensor 21 provided near the beam splitter 18. Between the beam splitter 18 and the AF sensor 21 is formed a reference focal plane 14A which is located at a position optically equivalent to the position at which the reticle plate 14 is placed.

The automatic level 10 is further provided with a focus state detecting system (focus detector) 20 and a focusing lens group driving system 30 (lens driver). The focus state detecting system 20 detects the focus state on the reference focal plane 14A via the AF sensor 21 which is positioned in the vicinity of the reference focal plane 14A. The focusing lens group driving system 30 controls the focusing lens group 12 to move along the optical axis O in accordance with the signals received from the focus state detecting system 20. The position of the focusing lens group 12 on the optical axis O is detected using a lens position detector 40. The lens position detector 40 detects the position of the rack 12a and outputs the detected results to a processing/control circuit (controller) 23.

The focus state detecting system 20 includes a preamplifier 22, the above-mentioned processing/control circuit 23, a RAM (lens position memory) 24 and an AF-motor drive circuit 25. The focusing lens group driving system 30 is composed of an AF motor 31, a clutch-incorporated reduction mechanism 32 and an encoder 33. The focus state detecting system 20, the structure thereof being known in the art, detects the focus state (in-focus or out-of-focus state, front or rear focus, and amount of defocus) in accordance with the signals output from the AF sensor 21. In this embodiment the AF sensor 21 is a phase-difference detection photosensor, and includes: a condenser lens, a pair of separator lenses, and a pair of line sensors (e.g., multi-segment CCD sensors) located behind the respective separator lenses (all not shown). The pair of separator lenses are arranged apart from each other by the base length. The image of the object formed on the reference focal plane 14A is separated into two by the pair of separator lenses to be respectively formed on the pair of line sensors.

Each of the pair of line sensors includes an array of photoelectric converting elements. Each photoelectric converting element converts the received light of an image into electric charges which are integrated (accumulated) and output as an integrated electric charge to the preamplifier 22 to constitute AF sensor data. The preamplifier 22 amplifies the input electric charge and outputs the an amplified electric charge to the processing/control circuit 23. The processing/control circuit 23, provided as an element of the focus state detecting system 20, calculates an amount of defocus through a predetermined defocus operation in accordance with the AF sensor data input from the pair of line sensors. Furthermore, in this embodiment the amount of driving of AF motor 31 (the number of pulses output from the encoder 33, i.e., the number of AF pulses) and the driving direction thereof which are necessary for moving the focusing lens group 12 to an axial position thereof, at which the amount of defocus becomes zero, are respectively calculated and determined in accordance with the amount of defocus calculated by the processing/control circuit 23. The number of AF pulses is registered in an AF pulse counter 23a in the processing/control circuit 23.

The processing/control circuit 23 is connected the an AF start switch (AF start operational button) 27 which is positioned on the body of the automatic level 10. The processing/control circuit 23 is connected to an AF/MF selector switch (AF switch) 29 positioned on the body of the automatic level 10. The AF/MF selector switch 29 is in an ON state when the AF Mode is selected, while the AF/MF selector switch 29 is in an OFF state when the MF (manual focusing) Mode is selected. The AF start switch 27 is a self-reset push button switch. The autofocusing process starts upon the AF start switch being manually depressed, i.e., upon the AF start switch being turned ON from OFF. In the autofocusing process, the processing/control circuit 23 drives the AF motor 31 via the AF-motor drive circuit 25 in accordance with the calculated number of AF pulses which has been registered in the AF pulse counter 23a and the determined driving direction of the AF motor 31. Rotation of the AF motor 31 is transmitted to the pinion 12b via the clutch-incorporated reduction mechanism 32 to move the focusing lens group 12. Rotation of the AF motor 31 is detected by the encoder 30 while the output of the encoder 30 is counted by the processing/control circuit 23 to control the rotational speed of the AF motor 31 or stop the AF motor 31 in accordance with the counted output value and the calculated amount of driving the AF motor 31.

The processing/control circuit 23 controls the focus state detecting system 20 and the focusing lens group driving system 30 to detect the focus state of the object image formed on the reference focal plane 14A and subsequently moves the focusing lens group 12 along the optical axis O to bring the sighting object into focus.

The RAM 24, provided in the focus state detecting system 20, stores the position of the focusing lens group 12 on the optical axis O (data of the axial position of the focusing lens group 12 or the position of the rack 12a) that is detected by the lens position detector 40. Upon completion of the autofocusing process which starts when the AF start switch 27 is depressed once and in which the focusing lens group 11 is moved to bring the sighting object into focus, the position (first position) of the focusing lens group 12 (data of the axial position of the focusing lens group 12) that is obtained after the autofocusing process is not stored in the RAM 24. However, if the AF start switch 27 is depressed again within a predetermined period of time (e.g., approximately 0.5~1 sec.) after the AF start switch 27 has been depressed once, the focusing lens group 12 is moved to a position (second position) other than the previous position (first position), to bring the sighting object into focus, and the axial position data of the second position is stored in the RAM 24. In other words, the position of the focusing lens group 12 is not stored in the RAM during a normal operation thereof wherein the AF switch is only depressed once. Subsequently, every time the AF start switch 27 is depressed within the predetermined period of time, the focusing lens group 12 is moved to a position (e.g., third position) other than the previous positions obtained thus far, to bring the sighting object into focus.

Thereafter, if the AF start switch 27 is only depressed once, all the axial position data stored in the RAM 24 is erased (S225). Accordingly, every time the AF start switch 27 is depressed within the predetermined period of time after the AF start switch 27 is previously depressed, the focusing lens group 12 is moved to a position other than the previous position (or positions) on the optical axis O. According to this control method, if the user judges, by viewing through the eyepiece 15, that the object being sighted is out-of-focus after the autofocusing process is performed once upon the AF start switch 27 being depressed once, the focusing lens group 12 is moved to an axial position other than the previous axial positions thereof if the AF start switch 27 is depressed twice within a predetermined period of time. This prevents the autofocusing process from being unnecessarily repeated at the same axial position at which an in-focus state of a target object cannot be obtained.

An embodiment of the autofocusing operation performed in the automatic level 10 will be hereafter discussed with reference to FIGS. 2 through 5. This autofocusing operation is performed by the processing/control circuit 23 in a state wherein a battery (not shown) for supplying power to the automatic level 10 is loaded in the automatic level 10.

Immediately after the battery is loaded in the automatic level 10, the processing/control circuit 23 initializes the RAM 24 and each of input/output ports (not shown) at step S101 and subsequently performs a power down process. Thereafter, the operation at step S101 is not performed again unless the battery is taken out of the automatic level 10 and re-loaded therein.

The power down process is a "stand-by process" which waits for the AF start switch 27 to be operated with all the circuits except for the processing/control circuit 23 being turned OFF while the AF start switch 27 is not operated, and turns the power ON to perform the autofocusing process (step S207) upon the AF start switch 27 being turned ON.

In the power down process, all the flags regarding the autofocusing operation are set to zero (step S111). The flags regarding the autofocusing operation include an in-focus flag which indicates that an in-focus state has been obtained, an autofocus NG flag (AFNG flag) that indicates that an in-focus state could not be obtained, a re-integral flag that indicates that the integrating operation has been performed after an in-focus state has been obtained, a currently-searching flag and an overlapping-operation flag indicating that each integrating operation has been performed while the focusing lens group 12 continues to move, and a storage-completed flag that indicates that the lens position has already been stored in memory.

After the operation at step S111 is completed, it is determined whether the AF start switch 27 is ON (step S113). Since the AF start switch 27 is OFF in an initial state wherein the AF start switch 27 has not been operated, an AF-start-switch memory (not shown) which is built into the processing/control circuit 23 is turned OFF; i.e., OFF-information is stored in the AF-start-switch memory (step S115). Thereafter it is determined whether the power is ON (step S119). Since the power is OFF in an initial state wherein the AF start switch 27 has not been operated, control returns to step S113, so that the operations S113, S115 and S119 are repeatedly performed until the AF start switch 27 is operated.

If it is determined at step S113 that the AF start switch 27 is turned ON, it is determined whether the AF-start-switch memory is ON, i.e, it is determined whether ON-information has been stored in the AF-start-switch memory (step S117). If the AF-start-switch memory is OFF (the AF-start-switch memory is OFF when control first enters the operation at step S117 after it is determined at step S113 that the AF start switch 27 is turned ON), the AF-start-switch memory is turned ON, i.e., ON-information is written into the AF-start-switch memory (step S123). Thereafter the state of the AF/MF selector switch 29 is checked to determine whether AF Mode is selected (steps S125 and S127). If it is determined at step S127 that the AF/MF selector switch is ON (i.e., AF Mode is currently selected), power is supplied to each circuit (step S129), and thereafter control proceeds to the VDD loop process shown in FIG. 3. If it is determined at step S127 that the AF/MF selector switch is OFF (i.e., MF Mode is currently selected), control returns to the power down process.

The AF-start-switch memory is ON when control returns to the power down process, so that control proceeds to step S121 via the operations at steps S113, S117 and S119 to turn the power OFF if the AF start switch 27 is ON, and control waits for the AF start switch 27 to be turned ON. If the AF start switch 27 is OFF, control proceeds from step S113 to step S115 wherein OFF-information is written into the AF-start-switch memory, and subsequently the power is turned OFF (step S121). Thereafter control waits for the AF start switch 27 to be turned ON.

Figure 2:
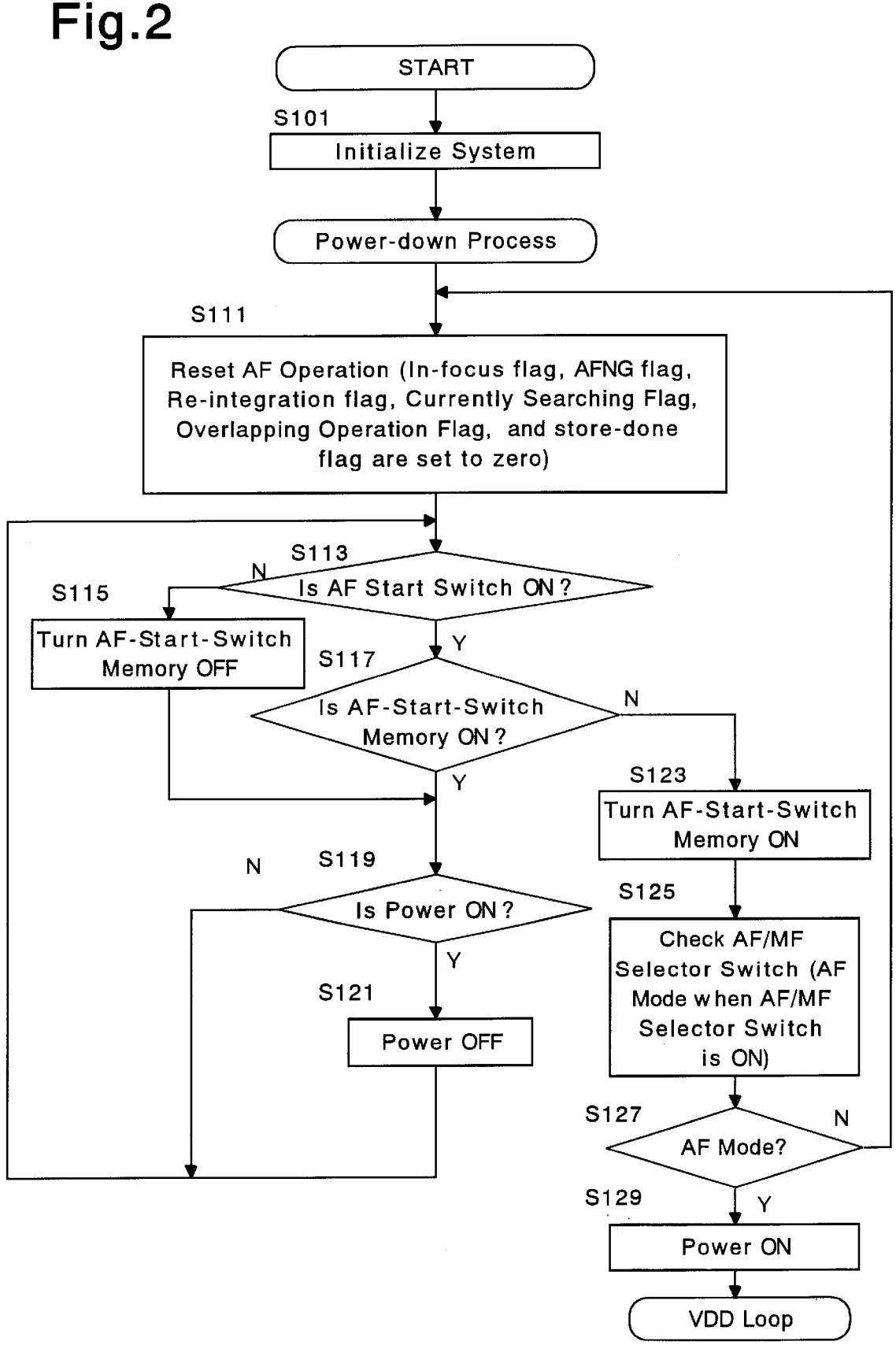
FIG. 2 is a flow chart showing part of the autofocusing operation (START) that is performed in the automatic level shown in FIG. 1.
Figure 3:
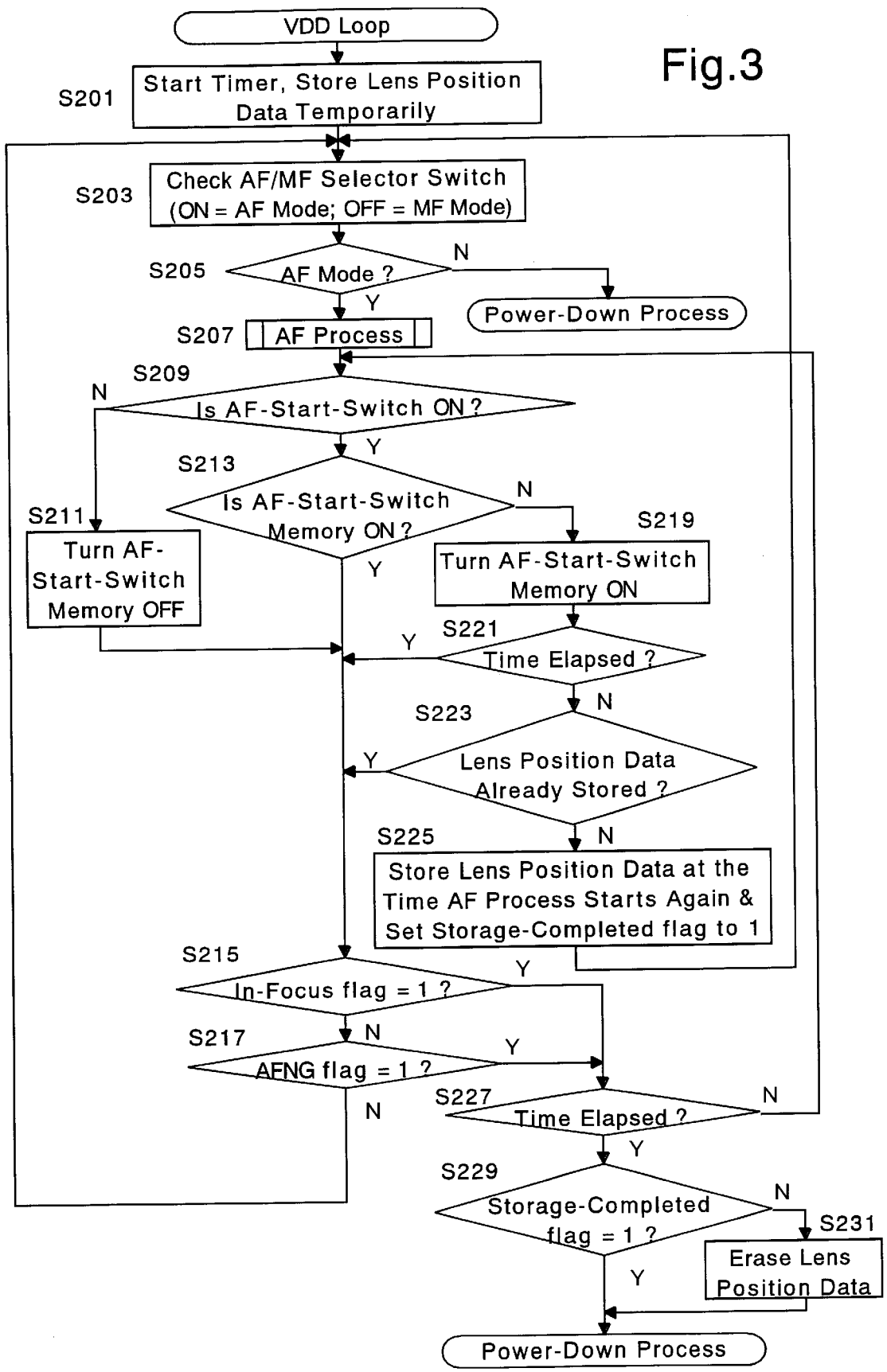
FIG. 3 is a flow chart showing another part of the autofocusing operation (VDD LOOP) that is performed in the automatic level shown in FIG. 1.

In the VDD loop process, the autofocusing process (step S207) is performed, and control returns to the power down process shown in FIG. 2 upon determining that an in-focus state is obtained, or that it is impossible to obtain an in-focus state, while checking the state of the AF start switch 27. In the VDD loop process, firstly a timer (switch-detection-expiration timer) in the processing/control circuit 23 is actuated to start while the current axial position of the focusing lens group 12 on the optical axis O is temporarily stored in the RAM 24 (step S201). Subsequently, the state of the AF/MF selector switch 29 is checked to determine whether AF Mode is selected (steps S203 and S205). Control enters the autofocusing process at step S207 if AF Mode is selected. Control enters the power down process if MF Mode is selected. The following discussion will be made on the assumption that the AF/MF selector switch 29 is ON (i.e., AF Mode is selected). It should be noted that the position of the focusing lens group 12 on the optical axis O which is temporarily stored in the RAM 24 is renewed every time control enters step S201.

If the AF/MF selector switch 29 is ON, the autofocusing process is performed in which the amount of defocus is detected to move the focusing lens group 11 to an axial position (in-focus position) thereof (step S207). After the autofocusing process at step S207, it is determined at regular intervals in the VDD loop process whether the AF start switch 27 is ON (step S209). Since the AF start switch 27 generally remains ON when control first enters the operation at step S209, it is determined whether the AF-start-switch memory is ON (step S213). Since the AF-start-switch memory has been turned ON at step S123, the state of each of the in-focus flag and the autofocus NG flag is checked (steps S215, S217).

If it is impossible to determine either that an in-focus state has been obtained or that an in-focus state cannot be obtained in the autofocusing process at step S207, the in-focus flag and the AFNG flag are zero, so that control returns to the autofocusing process at step S207 (steps S215 and S217). Thereafter, the operations at steps S203, S205, S207, S209, S213, S215 and S217 are repeatedly performed until either the in-focus flag or the autofocus NG flag is set to one; however, control proceeds from step S209 to step S211 to turn the AF-start-switch memory OFF if the AF start switch 27 is turned OFF and subsequently control returns to step S203 via the operations at steps S215 and S217.

After the focusing lens group 12 is moved to an in-focus position thereof by the autofocusing process at step S207, the in-focus flag is set to one in the autofocusing process at step S207, so that control can proceed from step S215 to step S227. At step S227, it is determined whether a predetermined period of time (e.g., 0.5 sec.) has elapsed since the timer started at step S201. Control returns to step S209 if the predetermined period of time has not yet elapsed, otherwise control proceeds to step S229 wherein it is determined whether the storage-completed flag has already been set to one. If the storage-completed flag has not been set to one, i.e., the storage-completed flag is zero, all the axial position data stored in the RAM 24 is erased and subsequently control returns to the power down process (step S231) to end the autofocusing operation. If it is determined at step S229 that the storage-completed flag has been set to one, control returns to the power down process to end the autofocusing operation.

If an in-focus state cannot be obtained due to reasons such as, for example, the sighting object is not still, the sighting object is too dark, and/or the contrast of the sighting object is too low; the autofocus NG flag is set to one in the autofocusing process at step S207, so that control proceeds from step S217 to step S227.

In the VDD loop process, when the AF start switch 27 is turned ON after it is turned OFF, control proceeds from step S209 to step S213. Since the AF-start-switch memory is OFF, control proceeds from step S213 to step S219 to turn the AF-start-switch memory ON. Thereafter, it is determined at step S221 whether the aforementioned predetermined period of time (e.g., 0.5 sec.) has elapsed since the timer starts at step S201, and control proceeds to step S223 if the predetermined period of time has not yet elapsed, otherwise control proceeds to step S215. At step S223 it is determined whether the data of the axial position of the focusing lens group 12 on the optical axis O (i.e., the data of the axial position of the focusing lens group 12 which has been temporarily stored at step S201) has been stored in the RAM 24. If it is determined at step S223 that the data has not been stored in the RAM 24, the data is subsequently stored in the RAM 24 and the storage-completed flag is set to one at step S225; thereafter, control returns to the autofocusing process of step S203. Accordingly, even if it is determined at step S221 that the aforementioned predetermined period of time (e.g., 0.5 sec.) has not yet elapsed since the timer started at step S201, control proceeds to step S215 if the data has been already stored in the RAM 24. In other words, if the AF switch is turned OFF and then ON within a predetermined period of time from when the timer started at step S201, the focusing lens position data that was temporarily stored in the RAM 24 at step S201 is stored in the RAM 24 so that it can be judged whether the control has entered another AF process.

Figure 4:
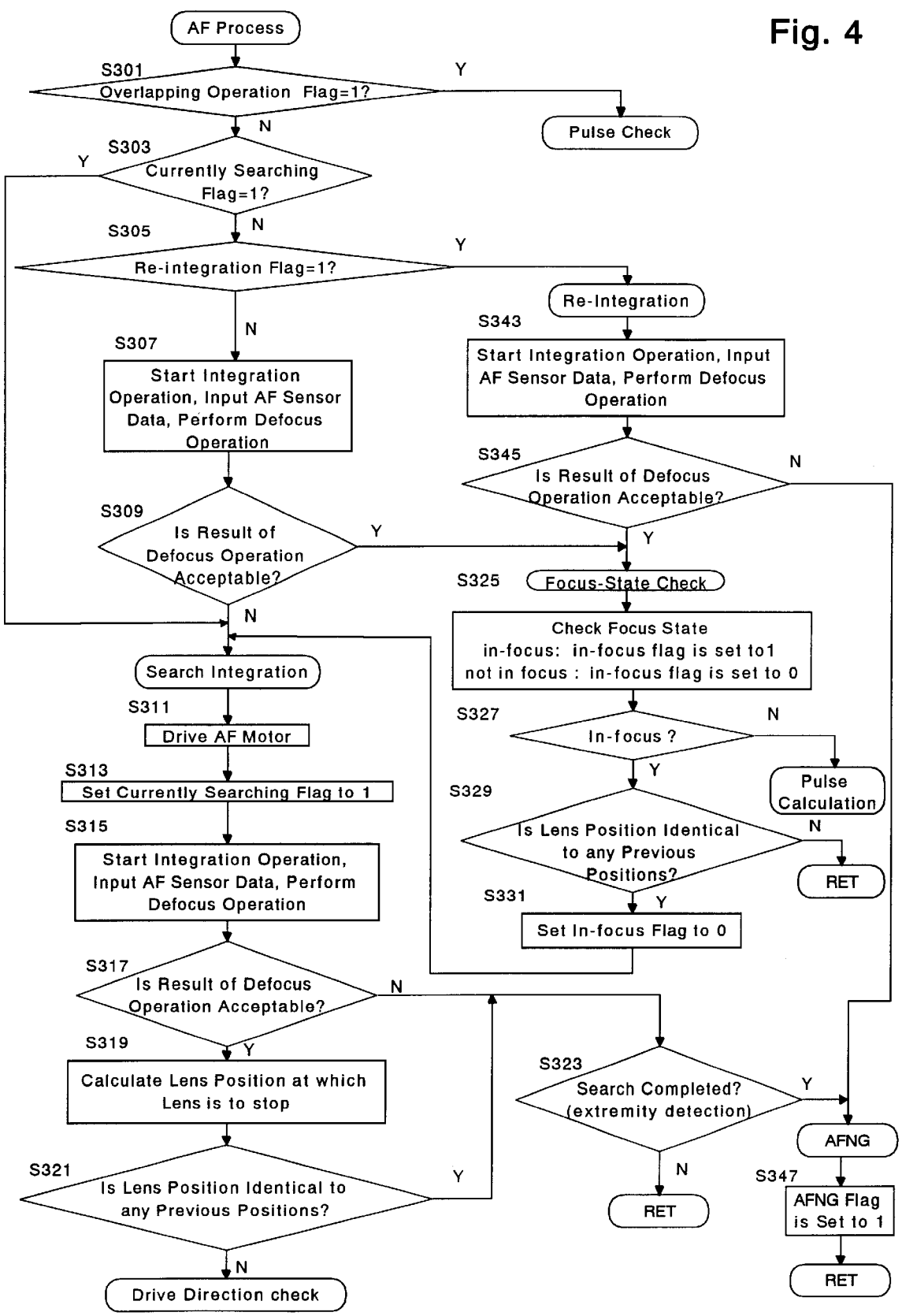
FIG. 4 is a flow chart of showing another part of the autofocusing operation (AF PROCESS) that is performed in the automatic level shown in FIG. 1.
Figure 5:
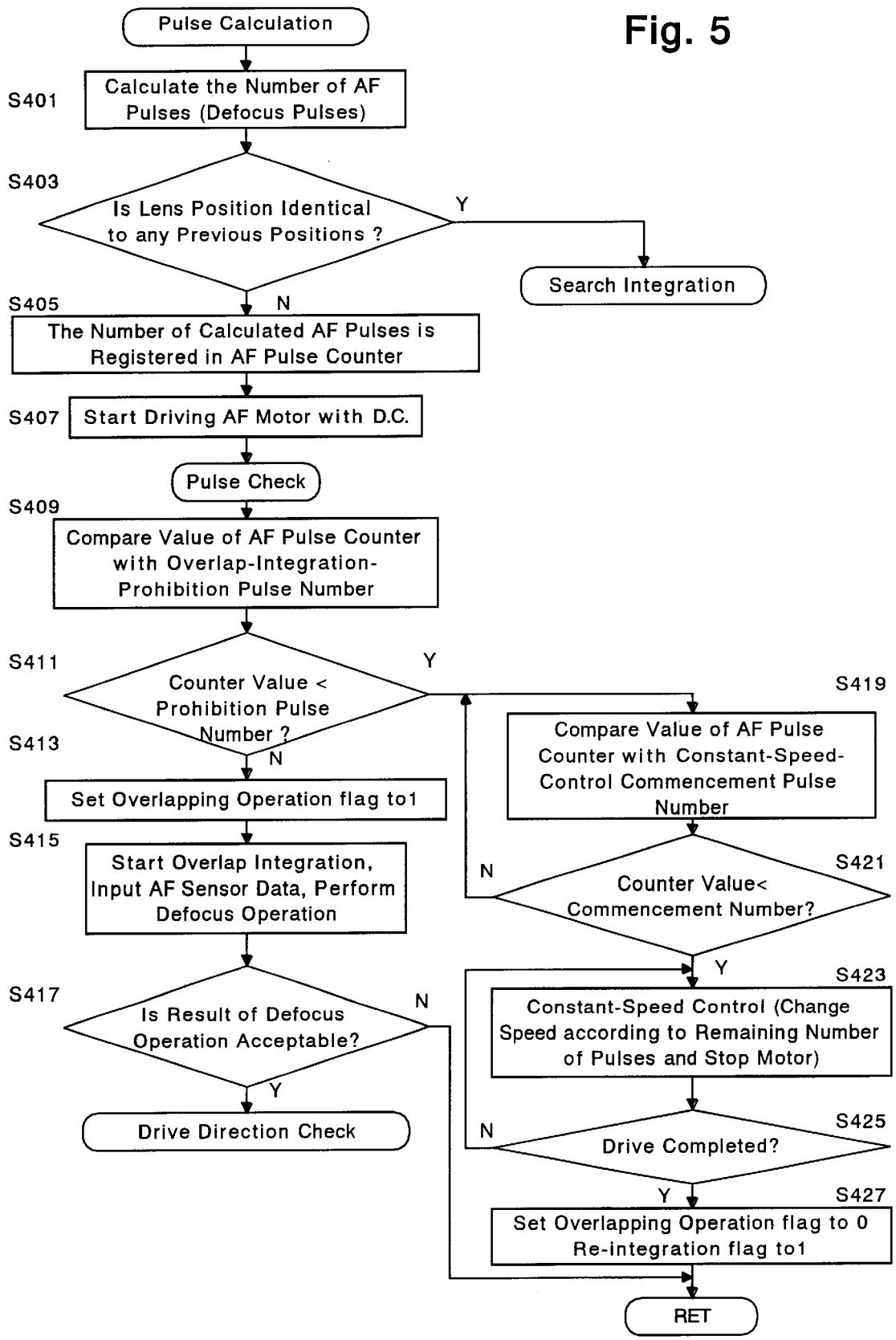
FIG. 5 is a flow chart of showing another part of the autofocusing operation (PULSE CALCULATION) that is performed in the automatic level shown in FIG. 1.
Figure 6:
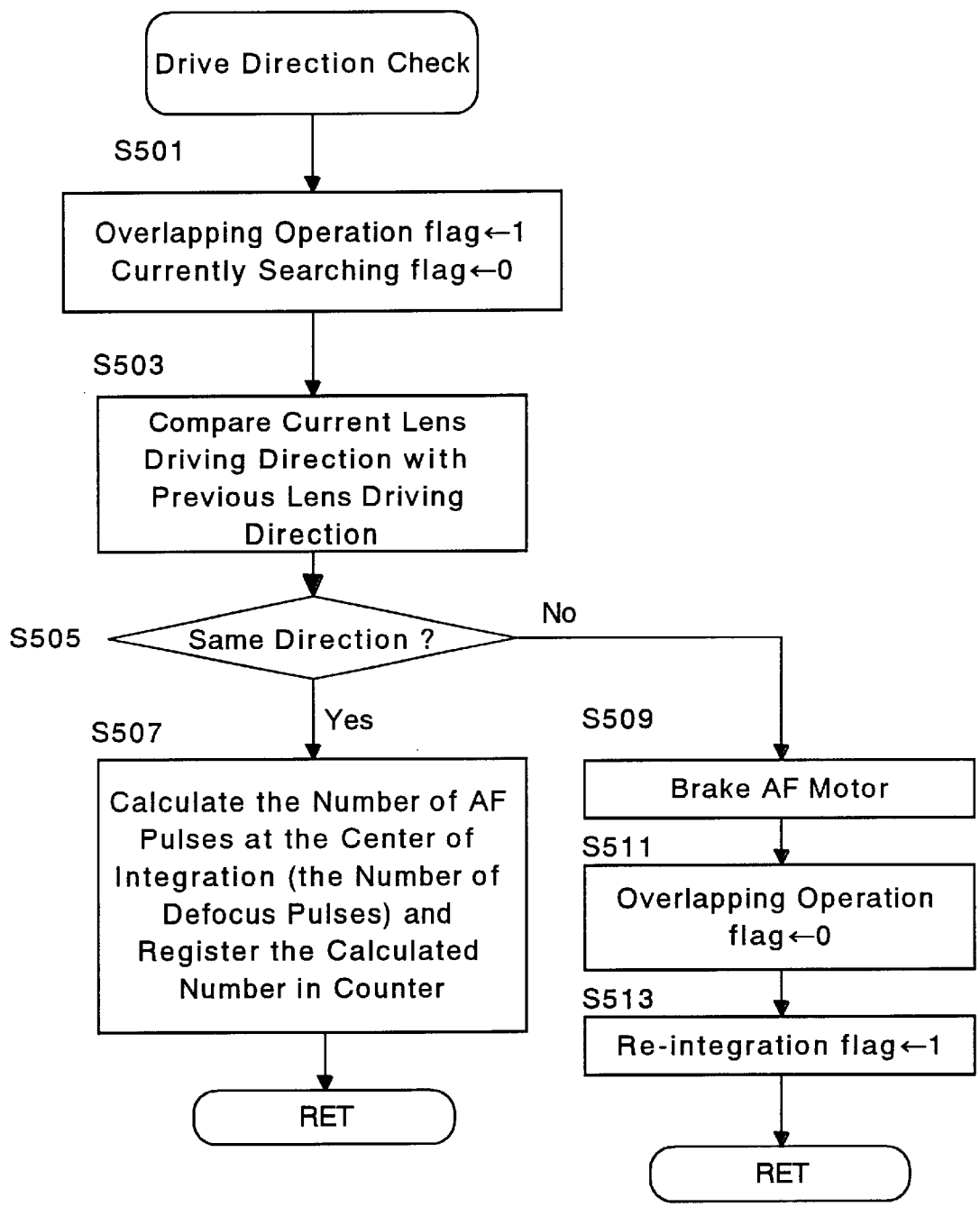
FIG. 6 is a flow chart of showing another part of the autofocusing operation (DRIVING DIRECTION CHECK) that is performed in the automatic level shown in FIG. 1.

The autofocusing operation at step S207 will be hereinafter discussed in detail with reference to the flow charts shown in FIGS. 4 through 6. In the autofocusing operation, it is determined whether the overlapping operation flag, the currently searching flag and the re-integration flag are zero, respectively (steps S301, S303 and S305). When control first enters the autofocusing process, control proceeds to step S307 via the operations at steps S301, S303 and S305 since the overlapping operation flag, the currently searching flag and the re-integration flag have been all initialized to zero at step S111. At step S307, the AF sensor 21 is controlled to start integrating (accumulating) electric charge, and subsequently the results of the integrating operation is input to the processing/control circuit 23 via the preamplifier 22 as AF sensor data to perform the predetermined defocus operation. In this operation, degree of correlation is determined, while an amount of defocus and the direction (front focus or rear focus) thereof are calculated and determined in accordance with the determined degree of correlation, respectively.

Subsequently, it is determined whether the result of the predetermined defocus operation is acceptable (step S309). The result of the predetermined defocus operation may be unacceptable if the contrast of the sighting object is too low, the sighting object has a repeating pattern and/or the luminance of the sighting object is too low. In most cases, the result of the predetermined defocus operation is acceptable, therefore the case wherein the result of the predetermined defocus operation is acceptable will be first discussed hereinafter.

If it is determined at step S309 that the result of the predetermined defocus operation is acceptable, control enters the focus-state checking process in which it is determined whether an in-focus state is obtained, an in-focus flag is set to one if an in-focus state is obtained, and an in-focus flag is set to zero if an in-focus state is not obtained (step S325). In the present embodiment, it is determined by the processing/control circuit 23 that an in-focus state is obtained when the amount of defocus is equal to or less than a predetermined amount of defocus.

Subsequently, it is determined whether the in-focus flag is zero or one (step S327). If the in-focus flag is zero (i.e., not in-focus), control proceeds to the pulse calculation process shown in FIG. 5. If the in-focus flag is one (i.e., in-focus), it is determined whether the current position of the focusing lens group 12 on the optical axis O is identical to any axial position stored in the RAM 24 (step S329). If the current position of the focusing lens group 12 on the optical axis O is identical to an axial position stored in the RAM 24, the in-focus flag is set to zero (step S331), and subsequently control enters the search-integration process. If the current position of the focusing lens group 12 on the optical axis O is not identical to any axial position stored in the RAM 24, control returns to the VDD loop process.

In the search-integration process, the predetermined defocus operation and the integrating operation are performed while driving the AF motor 31 to move the focusing lens group 12 from the focus point position of the closest object to the focus point position of an object at infinity so as to obtain an acceptable result of the focus operation.

In the pulse calculation process, the amount of driving of the AF motor 31, i.e., the number of pulses output from the encoder 33 (the number of AF pulses), that is necessary for moving the focusing lens group 12 to an axial position thereof, wherein the amount of defocus becomes zero, is calculated in accordance with an acceptable amount of defocus.

In the pulse calculation process, firstly the amount of driving of the AF motor 31 (the number of AF pulses) and the driving direction thereof are respectively calculated and determined in accordance with the calculated amount of defocus (step S401). Subsequently, it is determined whether the calculated position of the focusing lens group 12 as an in-focus position thereof that is determined by the calculation as step S401 is identical to any axial position stored in the RAM 24 (step S403). If the calculation position is identical to an axial position stored in the RAM 24, control enters the search-integration process shown in FIG. 4. If the calculation position is not identical to any axial position stored in the RAM 24, the number of AF pulses calculated in the operation at step S401 is registered in the AF pulse counter 23a (step S405), and subsequently the AF motor 31 is driven by direct current (step S407). Subsequently control enters the pulse check process. The value of the AF pulse counter 23a is decreased by one each time an AF pulse is output from the encoder 33.

In the pulse check process, the drive speed of the AF motor 31 is controlled in accordance with the value of the AF pulse counter 23a. More specifically, if the value of the AF pulse counter 23a is larger than a predetermined overlap-integration prohibition pulse number, the AF motor 31 is driven at a faster speed to move the focusing lens group 12 to an axial position thereof at which an in-focus state is obtained in a shorter period of time, and at the same time, an overlap integration is also performed. Once the value of the AF pulse counter 23a becomes smaller than the predetermined overlap-integration prohibition pulse number, the AF motor 31 continues to be driven at the faster speed, however the overlap integration is stopped. Subsequently, if the value of the AF pulse counter 23a becomes smaller than a predetermined constant-speed-control commencement pulse number, the AF motor 31 is driven at a slow speed with PWM (pulse width modulation) control so that the focusing lens group 12 does not overrun, and thereafter the AF motor 31 is stopped upon the value of the AF pulse counter 23a reaching zero.

In the pulse check process, the value of the AF pulse counter 23a is compared with the predetermined overlap-integration prohibition pulse number (step S409), and subsequently it is determined whether the value of the AF pulse counter 23a is smaller than the predetermined overlap-integration prohibition pulse number (step S411). If the value of the AF pulse counter 23a is equal to or greater than the predetermined overlap-integration prohibition pulse number, the overlapping operation flag is set to one (step S413). Subsequently, the overlap integration starts, the AF sensor data is input from the AF sensor 21, and the predetermined defocus operation is performed (step S415). Thereafter, it is determined whether the result of the predetermined defocus operation is acceptable (step S417). If the predetermined defocus operation is acceptable, control proceeds to the drive-direction check process shown in FIG. 6. If the predetermined defocus operation is unacceptable, control returns.

In the drive-direction check process, the number of AF pulses is calculated in accordance with the AF sensor data obtained by the integrating operation performed during the driving of the AF motor 31, and subsequently the calculated number of AF pulses is registered in the AF pulse counter 23a. However, the AF motor 31 is braked, stopping movement thereof, if the direction of driving of the AF motor 31 changes. In the present embodiment, when braking the AF motor, the processing/control circuit 23 short-circuits both terminals of the AF motor 31 to stop the rotation thereof.

In the drive-direction check process, the overlapping operation flag is set to one while the currently-searching flag is set to zero (step S501). Subsequently, the current direction of driving of the AF motor 31 is compared with the previous direction of driving of the AF motor 31 in accordance with the result of the predetermined defocus operation (step S503). Subsequently, it is determined whether the current direction of driving of the AF motor 31 is the same as the previous one (step S505). If the current direction of driving of the AF motor 31 is the same as the previous one (which is often the case), the number of AF pulses at the center of integration is calculated and registered in the AF pulse counter 23*a* (step S507), and subsequently control returns. If the current direction of driving of the AF motor 31 changes, the AF motor 31 is braked to stop the rotation thereof (step S509), the overlapping operation flag is set to zero (step S511) and the re-integration flag is set to one (step 513). Thereafter control returns.

Upon returning to the VDD loop process, control re-enters the AF process at step S207 again (i.e., focus detection is repeated), after performing the operation at step S209 and operations thereafter. During the time the direction of driving of the AF motor 31 does not change, the overlapping operation flag remains at one, so that control enters the pulse check process from step S301. Thereafter, control continues returning to the pulse check process until the value of the AF pulse counter 23*a* becomes less than the predetermined overlap-integration prohibition pulse number via the operations at steps S409, S413, S415, S417, S501, S503, S505 and S507.

Thereafter, during this process the number of AF pulses generally reduces and finally becomes less than the predetermined overlap-integration prohibition pulse number, thereby control proceeds from step S411 to step S419.

In the operations from steps S419 through S427, driving of the AF motor 31 by an amount corresponding to the calculated number of AF pulses is ended in order to stop the AF motor 31. Upon control entering the operation at step S419, the value of the AF pulse counter 23*a* is compared with the predetermined constant-speed-control commencement pulse number (step S419), and subsequently, it is determined whether the value of the AF pulse counter 23*a* is smaller than the predetermined constant-speed-control commencement pulse number (step S421). If the value of the AF pulse counter 23*a* is equal to or greater than the predetermined constant-speed-control commencement pulse number, control returns to step S419. Namely, due to the operations at steps S419 and S421, control waits for the number of AF pulses to be less than the predetermined constant-speed-control commencement pulse number. Subsequently, if it is determined at step S421 that the value of the AF pulse counter 23*a* is smaller than the predetermined constant-speed-control commencement pulse number, the AF motor 31 is driven at a slow speed with PWM control in accordance with the remaining number of AF pulses, and subsequently the AF motor 31 is stopped upon the value of the AF pulse counter 23*a* becoming zero (steps S423 and S425). Subsequently, immediately after the AF motor 31 stops, the overlapping operation flag is set to zero, and at the same time, the re-integration flag is set to one (step S427). Thereafter control returns to the VDD loop process.

If control enters the AF process at step S207 after returning to the VDD loop process, the overlapping operation flag is zero while the re-integration flag is one, so that control enters the re-integration process from step S305. This is also true in the case where it is determined at step S505 that the current direction of driving of the AF motor 31 changes from the previous direction.

In the re-integration process, the predetermined defocus operation is performed again, and subsequently it is determined whether the result of the defocus operation is acceptable or not. In the re-integration process, the AF sensor 21 is controlled to start integrating (accumulating) electric charge, and subsequently, the results of the integrating operation is input to the processing/control circuit 23 via the preamplifier 22 as AF sensor data to perform the predetermined defocus operation (step S343). Subsequently, it is determined whether the result of the predetermined defocus operation is acceptable (step S345).

If it is determined at step S345 that the result of the predetermined defocus operation is acceptable, control enters the focus-state checking process which starts from the operation step S325. If the result of the predetermined defocus operation is unacceptable, control enters the AFNG process in which the AFNG flag is set to one (step S347), and subsequently control returns to the VDD loop process, so that control proceeds from step S217 to step S227. If it is determined at step S227 that the predetermined period of time (e.g., 0.5 sec.) has elapsed since the timer starts at step S201, control returns to the power down process via the operation at step S229, and operations thereafter, to end the AF operation.

The above illustrated process is directed to the case where the sighting object can be brought into focus. If it is difficult or impossible to bring the sighting object into focus, control also returns to the power down process via the VDD loop process.

The autofocusing process if it is difficult or impossible to bring the sighting object into focus will be hereinafter discussed. Upon entering the autofocusing operation, control performs, via the operations at steps S301, S303 and S305, the operation at step S307 in which the AF sensor 21 starts integrating (accumulating) electric charge while the results of the integrating operation is input to the processing/control circuit 23 as AF sensor data to perform the predetermined defocus operation. If it is determined at step S309 that the result of the predetermined defocus operation is unacceptable, control enters the search-integration process.

If an acceptable result of the defocus operation cannot be obtained through the search-integration process, the AFNG flag is set to one and control returns. Thereafter, control proceeds from step S217 to step S227 to perform the operation at step S227 and operations thereafter. Subsequently, if it is determined at step S227 that the predetermined period of time (e.g., 0.5 sec.) has elapsed since the timer started at step S201, control returns to the power down process via the operation at step S229, and operations thereafter, to end the AF operation.

In the search-integration process, the AF motor 31 is driven in order to search an in-focus point, initially in the direction of bringing an object of a near distance into focus (step S311). Subsequently, the currently searching flag is set to one (step S313). Subsequently, the AF sensor 21 is controlled to start integrating (accumulating) electric charge, and the results of the integrating operation are input to the processing/control circuit 23 as AF sensor data to perform the predetermined defocus operation (step S315). Subsequently, it is determined whether the result of the predetermined defocus operation is acceptable (step S317).

If the result of the predetermined defocus operation is acceptable, the position (in-focus position) on the optical axis to which the focusing lens group 12 is to be moved to obtain an in-focus state is calculated (step S319). Subsequently, it is determined whether this calculation position is identical to any axial position stored in the RAM 24 (step S321). If the calculation position of the focusing lens group 12 on the optical axis O is not identical to any axial position stored in the RAM 24, control enters the drive-direction check process. If the calculation position of the focusing lens group 12 on the optical axis O is identical to an axial position stored in the RAM 24, it is determined whether the focusing lens group 12 is currently positioned at the infinity position thereof (step S323). If the focusing lens group 12 is currently positioned at a position other than the infinity position, control returns to the VDD loop process to perform the operation at step S209 and operations thereafter. If the focusing lens group 12 is currently positioned at the infinity extremity, control enters the AFNG process in which the AFNG flag is set to one (step S347). Subsequently, control returns to the VDD process to perform the operation at step S209 and operations thereafter. In the AF-motor driving operation (search-driving operation) at step S311, the AF motor 31 is first driven to search for an in-focus point in the direction of bringing an object of a near distance into focus as noted above, and secondly, the AF motor 31 is driven in reverse to search the same immediately after the focusing lens group 12 reaches the closest distance extremity thereof and stops. Thirdly, the AF motor 31 is stopped immediately after the focusing lens group 12 reaches the infinity distance extremity thereof and stops. Once an acceptable amount of defocus is obtained during the search-integration process, control returns to the operation in which the AF motor 31 is driven in accordance with the obtained amount of defocus.

If control again enters the AF process at step S207 after returning to the VDD loop process, the overlapping operation flag is zero while the re-integration flag is one, so that control enters the search-integration process from step S303 to perform the search-integration process at step S311 and operations thereafter. If an acceptable amount of defocus cannot be obtained even if the focusing lens group 12 reaches the infinity distance extremity thereof, control enters the AFNG process in which the AFNG flag is set to one and subsequently control returns. Thereafter, control proceeds from step S217 to step S227 to perform the operation at step S227 and operations thereafter. Subsequently, if it is determined at step S227 that the predetermined period of time (e.g., 0.5 sec.) has elapsed since the timer starts at step S201, control returns to the power down process via the operation at step S229, and operations thereafter, to end the AF operation.

Although the above illustrated process is directed to the case wherein an acceptable result of the predetermined defocus operation cannot be obtained from the start, if an acceptable result of the predetermined defocus operation can be obtained once, but an in-focus state cannot be obtained, and subsequently an acceptable result of the predetermined defocus operation cannot be obtained in the re-integration process even after the focusing lens group is driven, control proceeds from step S345 to the AFNG process in which the AFNG flag is set to one and subsequently control returns to the VDD loop process. Thereafter control proceeds from step S217 to step S227 to perform the operation at step S227 and operations thereafter.

According to all the processes discussed above, even if the focusing lens group stops once at a position (first axial position) on the optical axis O following the completion of the autofocusing operation after the autofocusing process is performed upon the AF start switch 27 being turned ON, the autofocusing process is performed in the subsequent autofocusing operation so that the focusing lens group 12 is moved to another position (second axial position) other than the aforementioned first axial position on the optical axis O only if the AF start switch 27 is turned ON more than once before a predetermined period of time elapses, since the timer started at step S201 performed after the AF start switch 27 is turned ON. Therefore, a focal point relative to the sighting object can be searched quickly. This type of autofocusing control is most effective if the amount of movement of the focusing lens group is very large relative to the focal-point detectable range that can be obtained from first image information output from the AF sensor, as in the case of a sighting telescope incorporated in a surveying instrument. According to such an autofocusing control, even if an object other than the sighting object is brought into focus by mistake, another focal point can be quickly searched by a simple operation.

In the illustrated embodiment of the autofocusing operation performed in the automatic level 10, although the aforementioned predetermined period of time which elapses since the timer starts at step S201 is set at 0.5 seconds, the aforementioned predetermined period of time can be set within approximately 0.5~1 seconds as noted above.

As can be understood from the foregoing, according to the present embodiment of the autofocusing apparatus of a sighting telescope, since the controller controls the lens driver to continue to move the focusing lens group until the focusing lens group is moved to another in-focus position other than the in-focus position if the AF switch is operated more than once within a predetermined period of time from the moment the AF switch is initially operated, the sighting object can be brought into focus in a quick manner.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An autofocusing apparatus of a telescope, comprising:
    a telescopic optical system which comprises a focusing lens group guided along an optical axis;
    a focus detector which detects a focus state of the telescopic optical system;
    a lens driver which drives the focusing lens group along the optical axis;
    an AF switch which is manually operated; and
    a controller which performs a first AF operation to control the lens driver to move the focusing lens group to an in-focus position on the optical axis in accordance with a result of detection of the focus detector each time the AF switch is operated;
    wherein the controller performs a second AF operation when the AF switch is operated more than once within a predetermined period of time, after the first AF operation is performed, the second AF operation comprising the movement of the focusing lens group by the lens driver to move the focusing lens group until the focusing lens group is moved to a second in-focus position other than the in-focus position, upon a later operation of the AF switch within the predetermined period of time; the second in-focus position being determined in accordance with the result of detection of the focus detector that is repeatedly actuated during the movement of the focusing lens group.

2. The autofocusing apparatus according to claim 1, further comprising a lens position memory which stores a position of the focusing lens group on the optical axis after the focusing lens group is moved each time the AF switch is operated;

wherein the controller controls the lens driver to move the focusing lens group to a position other than the position stored in the lens position memory in the second AF operation.

3. The autofocusing apparatus according to claim 2, wherein the controller erases all the positions stored in the lens position memory if the AF switch is not operated more than once within the predetermined period of time.

4. The autofocusing apparatus according to claim 1, wherein the autofocusing apparatus is incorporated in a surveying instrument.

5. The autofocusing apparatus according to claim 1, wherein the focus detector comprises a photosensor of a phase-difference detection type which comprises a pair of line sensors.

6. The autofocusing apparatus according to claim 2, wherein the lens position memory comprises a RAM in which positional data of the focusing lens group is stored.

7. An autofocusing apparatus of a telescope, comprising:

a telescopic optical system which comprises a focusing lens group guided along an optical axis;

a focus detector which detects a focus state of the telescopic optical system;

a lens driver which drives the focusing lens group along the optical axis; and a controller which controls the lens driver in either one of a first control and a second control;

wherein in the first control, the controller controls the lens driver to move the focusing lens group to an in-focus position on the optical axis in accordance with a result of detection of the focus detector; and wherein in the second control, after the first control has been performed, the controller performs an operation to control the lens driver to move the focusing lens group until the focusing lens group is moved to a second in-focus position other than the in-focus position, the second in-focus position being determined in accordance with the result of detection of the focus detector that is repeatedly actuated during the movement of the focusing lens group.

8. The autofocusing apparatus according to claim 7, further comprising an AF switch which is manually operated, wherein the first control is executed every time the AF switch is operated.

9. The auto focusing apparatus according to claim 8, wherein the second control is executed when a predetermined operation that is different from the operation of the AF switch in the first control is performed.

10. The autofocusing apparatus according to claim 9, wherein the predetermined operation comprises operating the AF switch more than once within a predetermined period of time; and wherein the operation to move the focusing lens group to the second in-focus position is executed by a later operation of the AF switch.

* * * * *